Feb. 20, 1962 D. B. ORCUTT 3,022,042
PIPE RAM
Filed March 28, 1960 2 Sheets-Sheet 1
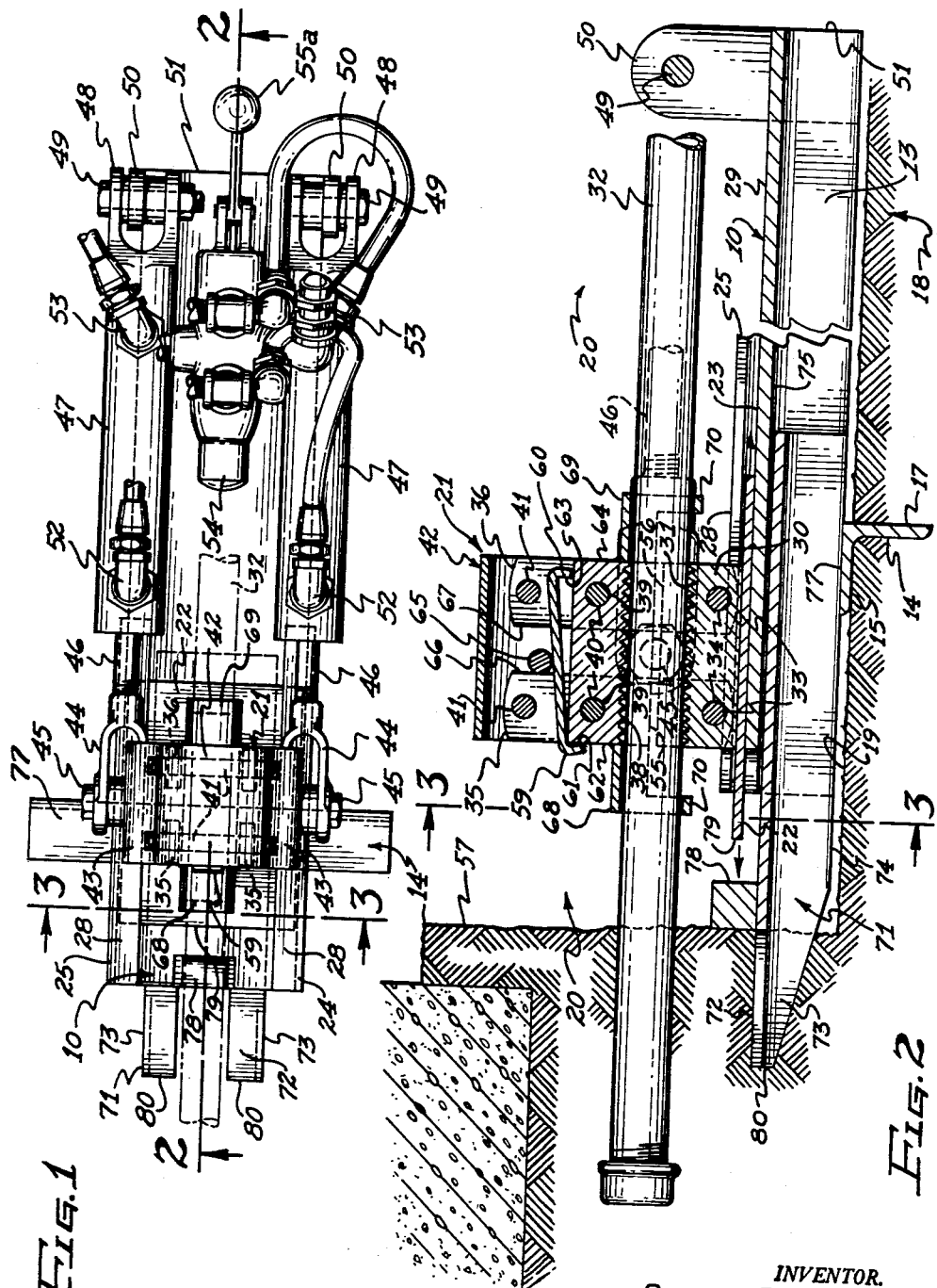
INVENTOR.
DONALD B. ORCUTT
BY
Willard S. Brown
ATTORNEY

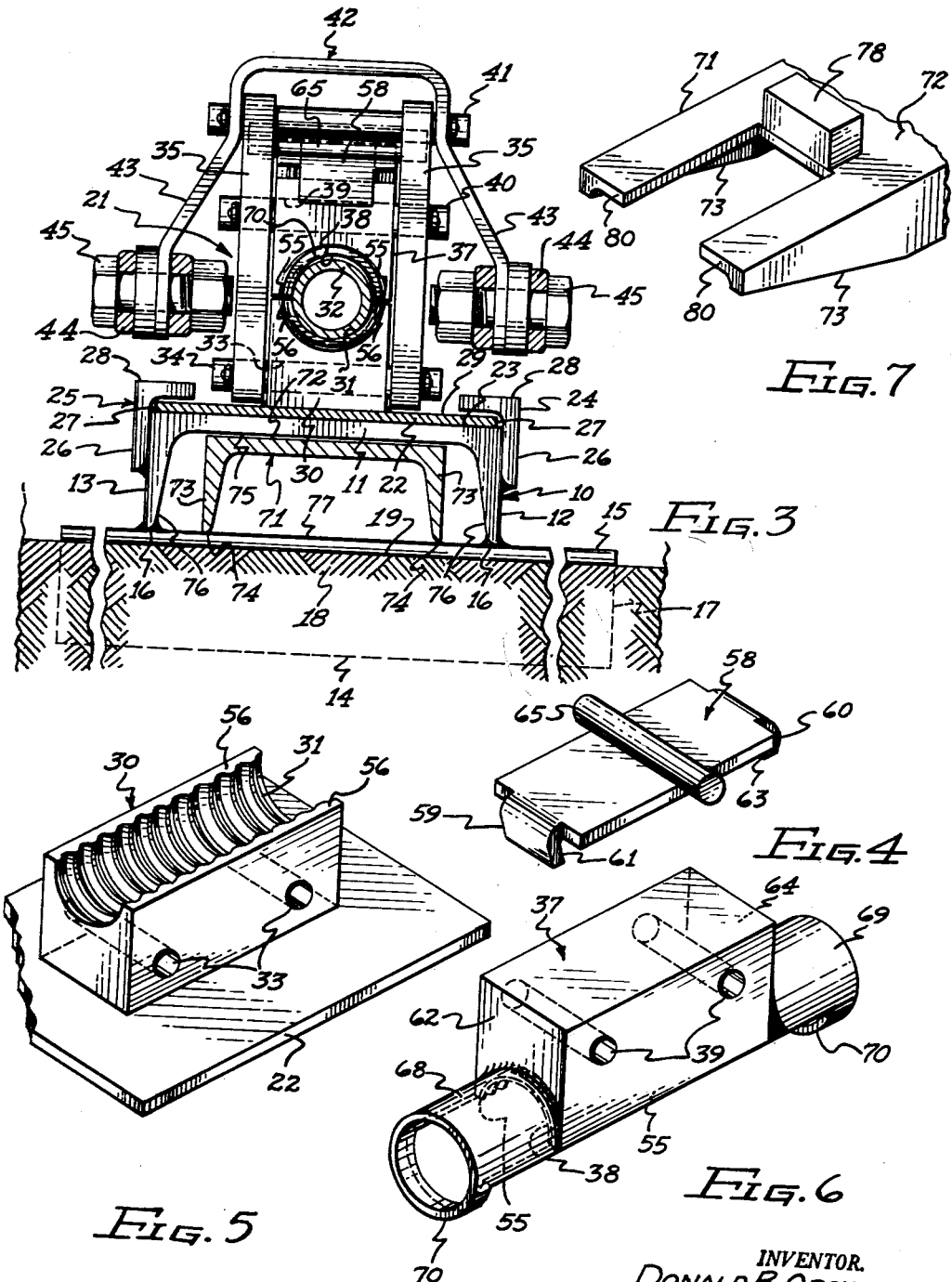

ced Feb. 20, 1962

3,022,042
PIPE RAM
Donald B. Orcutt, El Modeno, Calif., assignor to Mite Pipe Ram Company, Orange, Calif., a corporation of California
Filed Mar. 28, 1960, Ser. No. 18,043
1 Claim. (Cl. 254—29)

This invention pertains to improvements in pipe rams and is particularly directed to a pipe ram adapted to installing new pipe lines and replacing old pipe lines underground.

One of the objects of this invention is to provide a pipe ram particularly well adapted to replace old underground pipe or lay new pipe, copper or plastic tubing in a minimum amount of time.

Still another object of this invention is to provide a pipe ram for installing or replacing old pipe lines under roadways, walks and other obstructions without excavation of trenches or tunnels.

Another object of this invention is to provide a power actuated pipe ram which is particularly adapted to either pull or insert pipe in the same position of a pipe line to be replaced.

And it is also an object of this invention to provide a pipe ram which can pull or push pipe through the ground with a minimum amount of initial starting hole excavation being required and which can provide the desired amount of thrust needed to lay any length of pipe.

And a further object is to provide a power operated pipe ram such that a single person operates the entire installation.

Further features and advantages of this invention will appear from a detailed description of the drawings in which:

FIG. 1 is a plan view of a pipe ram apparatus incorporating the features of this invention.

FIG. 2 is an enlarged sectional view on the line 2—2 of FIG. 1.

FIG. 3 is an enlarged sectional view on the line 3—3 of FIGS. 1 and 2.

FIG. 4 is an enlarged perspective view of the reversing plate.

FIG. 5 is an enlarged perspective view of the carriage plate and lower pipe gripper block.

FIG. 6 is an enlarged perspective view of the upper pipe gripper block.

FIG. 7 is an enlarged perspective view of the stabilizer bar.

As an example of one embodiment of this invention there is shown a pipe ram incorporating the features of this invention comprising a bed 10 in the form of a channel member having a top horizontal portion 11 and downwardly extending sides 12 and 13. A thrust member 14 takes the form of an angle iron having a top leg 15 rigidly fixed to the bottom edges 16 of the bed 10 and having a vertically disposed downwardly extending thrust leg 17 arranged transversely of the bed 10, the leg 17 being embedded in the ground 18 at the bottom 19 of the starting hole excavation 20.

The power reciprocated automatic pipe gripper indicated generally at 21 is mounted on the carriage plate 22 which slides on the top surface 23 of the top portion 11 of the bed 10 and is held for sliding movement thereon by the gib angle pieces 24 and 25 having downwardly extending legs 26 fixed to the side portions 12 and 13 of the bed 10 and slidingly engaging the edges 27 of the carriage plate 22, the upper horizontal legs 28 of the gib angle pieces slidingly engage the top surface 29 of the carriage plate 22 so that this plate is thus accurately guided for horizontal longitudinal movement on the bed 10.

Fixed on the top surface 29 of the carriage plate 22 is the lower pipe alignment and gripper block 30 having a semi-cylindrical serrated pipe engaging surface 31 of a radius to suit the desired size of the pipe 32 to be handled. In the block 30 are formed the transverse bores 33 in which are carried the pins 34 and upstanding links 35 and 36 are pivotally mounted at their lower ends on said pins 34. An upper pipe gripper block 37 has a semi-cylindrical serrated pipe engaging surface 38 similar to the surface 31 of the lower block 30, the upper block 37 having bores 39 in which are carried pins 40 which are pivotally connected intermediate the ends of the links 35 and 36. The upper ends of the links 35 and 36 pivotally carry the pins 41 which pins in turn pivotally support the actuating yoke 42. The yoke 42 has downwardly extending side portions 43 to which are pivotally connected the bifurcated ends 44 of the piston rods 46 by the bolts 45. The piston rods 46 are operatively mounted in the actuating cylinders 47 which cylinders 47 in turn are pivotally mounted by their bifurcated rear ends 48 on suitable bolts 49 carried in the upstanding lugs 50 fixed to the rear end 51 of the bed 10. The cylinders 47 are of the usual reversible fluid pressure type and have their ports 52 and 53 connected to a reversing control valve 54 supplied from a suitable source of fluid pressure, the valve 54 being actuated by suitable manipulation of its control handle 55a.

It will thus be noted that by appropriately energizing the cylinders 47 the actuating yoke 42 may be reciprocated longitudinally of the bed 10. When the links 35 and 36 are in substantially a vertical position the upper pipe gripper block 37 has its bottom surfaces 55 spaced above the top surfaces 56 of the lower pipe gripper block 30 and in this position the pipe gripping surface 38 of the upper block is released from the pipe 32 which is free to relatively slide on the pipe engaging surface 31 of the lower block 30. When the links 35 and 36 are rocked by the yoke 42 to either side of said vertical position, the upper block is moved longitudinally and downwardly toward the lower block to grip the pipe 32 between the gripping surfaces 31—38 whereupon continued movement of the yoke 42 by the cylinders causes the pipe gripper 21 and the pipe 32 to be pushed into or pulled from the ground embankment 57.

By limiting the vertical positioning of the links 35 and 36 for one direction of travel or the other of the yoke, the gripping surfaces 31—38 can be made to intermittently move the pipe in one direction or in the opposite direction by the manipulation of the control valve handle 55a. To this end there is provided a reversing plate 58 having downturned abutment lugs 59 and 60 formed on each end thereof, the lug 59 having an abutment surface 61 adapted to engage the end surface 62 of the upper pipe gripper block 37 while the abutment lug 60 has an abutment surface 63 adapted to engage the end surface 64 of the upper block 37. It will be noted that the distance between the abutment surfaces 61 and 63 is less than the distance between the end surfaces 62 and 64 of the upper block 37 so that the plate 58 must be shifted to one end, as shown in FIG. 2, to engage surfaces 61—62 and to the other end to engage surfaces 63—64. Rigidly fixed to the top of the reversing plate is the transversely disposed stop pin 65 which is adapted to engage the surfaces 66 of links 35 when surfaces 61—62 are in engagement as shown in FIG. 2 and the stop pin 65 engages surfaces 67 of the links 36 when surfaces 63—64 are in engagement.

Fixed on the end surfaces 62 and 64 of the upper pipe gripper block are the pipe cleaners and guides 68 and 69 having ring ends 70 slidingly engaging around the exterior of the pipe 32. For greater stability of the bed 10 during the operation of the device, there is provided a stabilizer bar 71 comprising a channel iron member having a top 72 and downwardly extending sides 73 having bottom edges 74 which portions are respectively slidingly guided by the surfaces 75 of the bed 10 and the surface 77 of the thrust member 14. A lug 78 is rigidly fixed to the stabilizer bar 71 which is adapted to be engaged by the front edge 79 of the carriage plate 22.

To place the machine in operation a small trench 20 is dug and the pipe ram device is placed on the bottom 19 with the thrust leg 17 of the thrust member 14 pressed in the ground. The cylinders 47 are then energized to move the carriage plate 22, to the left in FIG. 2, causing the front edge 79 thereof to engage the lug 78 of the stabilizer bar 71 forcing its outer ends 80 into the embankment 57 to rigidly lock the bed 10 in operative position. The pipe 32 to be pushed through the embankment is then placed in the device and the reversing plate 58 positioned, as shown in FIG. 2, with surfaces 61—62 in contact. As the cylinders 47 are energized to move yoke 42 to the left in FIG. 2, the pipe 32 is gripped between the blocks 30 and 37 and caused to move therewith as the carriage plate moves on the base 10. At the completion of the forward stroke, the cylinders 47 are reversed pulling the yoke to the right until links 35 are stopped in vertical disengaged position of the blocks 30—37 by the stop pin 65, the rings 70 at this time lifting the pipe 32 from the lower pipe engaging surface 31 and holding the pipe away from contact with the upper pipe engaging surfaces 38 whereupon the carriage plate 22 slides back to the right ready for the next forward thrust stroke moving the pipe into the embankment 57. This is the procedure when inserting new pipe.

When it is desired to withdraw old pipe from the embankment 57 and to install new pipe or copper or plastic tubing in its place by attaching the new pipe to the other end of the old pipe and drawing it through the hole vacated by the old pipe, the reversing plate is moved to the right, FIG. 2, with abutment surfaces 63—64 into engagement. Thus, when the cylinders 47 are energized the blocks 30—37 will grip the pipe 32 when moving to the right and release the pipe when returning to the left to effect pulling of the pipe out of the embankment 57 as described.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claim are intended to be included herein.

Having thus fully set forth and described this invention what is claimed and desired to be obtained by United States Letters Patent is:

A pipe ram machine comprising in combination:

(a) a base,
(b) means to secure said base to the ground in operative position relative to an embankment face through which a pipe is to be rammed,
(c) a carriage plate reciprocatably mounted on said base,
(d) a lower pipe alignment and gripper block fixed on said plate having,
(e) a pipe engaging surface thereon,
(f) an upper pipe gripper block,
(g) parallel links pivotally mounted on said carriage and pivotally connected to said upper block so that said upper block is adapted to move in parallel rectilinear motion to and from pipe gripping position relative to said lower block,
(h) a power actuator on said base interconnected between said base and said parallel links adapted to move said links and said upper block to and from pipe gripping position with said lower block and to reciprocate said carriage plate when said upper block is in pipe gripping position with said lower block,
(i) means for positioning said parallel links for one direction of travel or the other of said upper block comprising,
(j) a reversing plate having,
(k) opposed abutment surfaces adapted to alternately engage mating opposed abutment surfaces on said upper block,
(l) and having further means to alternately engage and arrest swinging movement of said parallel links to effect a reversal of gripping action between said upper and lower jaws and movement of said carriage plate by the repositioning of said reversing plate.

References Cited in the file of this patent

UNITED STATES PATENTS

| | | |
|---|---|---|
| 1,427,699 | Richter | Aug. 29, 1922 |
| 2,935,298 | Wilwerding | May 3, 1960 |